(No Model.)
T. A. EDISON.
VACUUM APPARATUS.
No. 266,588. Patented Oct. 24, 1882.
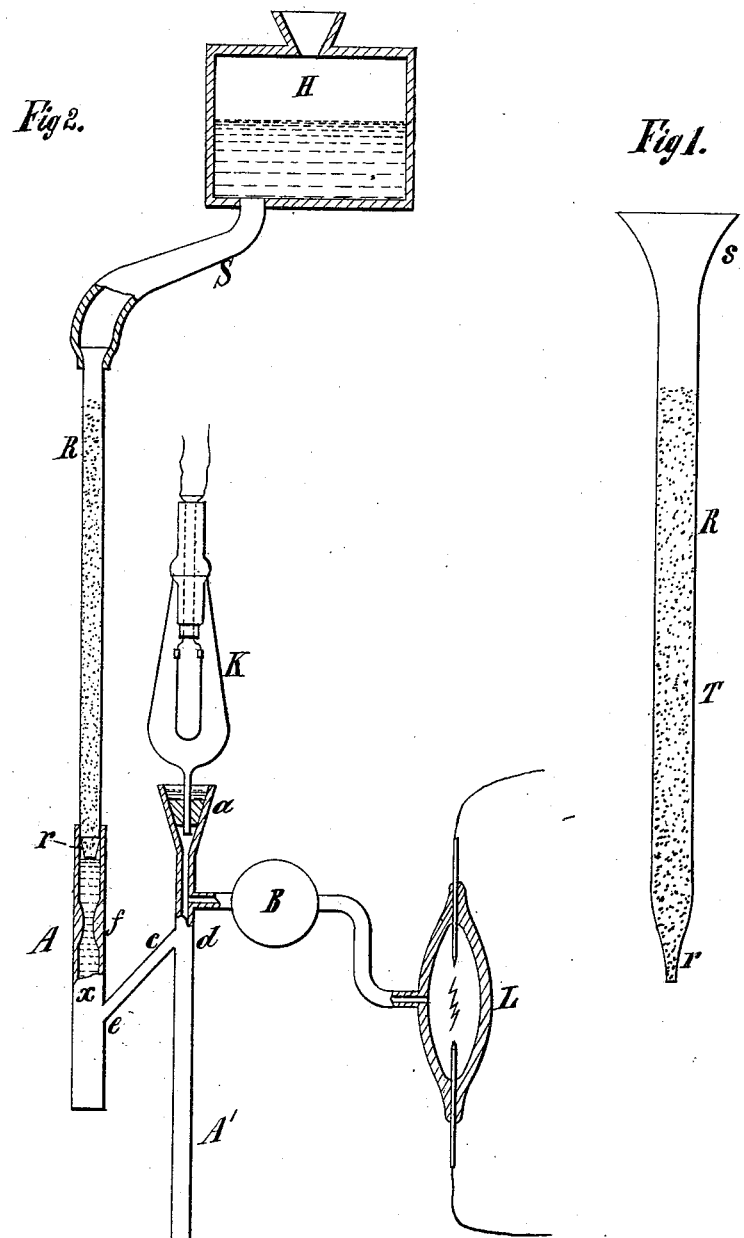
WITNESSES:
O. D. Mott
J. Ell Clark.
INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

VACUUM APPARATUS.

SPECIFICATION forming part of Letters Patent No. 266,588, dated October 24, 1882.

Application filed December 6, 1881. (No model.)

*To all whom it may concern:*

Be it known that I, THOMAS A. EDISON, of Menlo Park, in the county of Middlesex and State of New Jersey, have invented a new and useful Improvement in Vacuum Apparatus, (Case 364;) and I do hereby declare that the following is a full and exact description of the same, reference being had to the accompanying drawings, and to the letters of reference marked thereon.

In the continued use of mercury in vacuum apparatus it is liable to become more or less foul and dirty, while it is essential for the most perfect and rapid operation of such apparatus that the mercury should be clean and bright. The object, therefore, I have in view is to produce a method and means for cleaning the mercury. This I accomplish by filtering the mercury through finely broken or crushed glass. I find that the best effect is obtained by retarding the flow of the mercury through the glass, this being readily accomplished by making the outlet small enough for the purpose. In practice I prefer to employ a glass tube having its lower end drawn out into a smaller or capillary tube, which retards the flow of the mercury. The body of the tube is filled with finely broken or crushed glass. This filtering-tube may be used alone independent of the vacuum apparatus, or it may be attached to and form a portion of the same, the mercury passing through the filter before reaching the drop-tube of the vacuum apparatus. This is a very convenient form for the filter, since the mercury is cleaned each time it passes through the vacuum apparatus.

The foregoing will be better understood from the drawings, in which Figure 1 is a view of the mercury-filter separate from the vacuum apparatus, and Fig. 2 a view showing the filter forming a part of the vacuum apparatus.

In Fig. 1, R is the glass tube drawn out into a capillary tube at its lower end, *r*. Its upper end, *s*, may, for convenience, be given a funnel shape. This tube is filled partially or wholly with glass broken or crushed quite fine, as indicated by T.

In Fig. 2 the filter R, with reduced lower end, *r*, is shown as placed between the elevated mercury-reservoir H and first drop-tube, A, of a Sprengel pump. The mercury on its course from the reservoir to the drop-tube is forced to pass through the filter.

What I claim is—

1. The mercury-filter consisting of a tube or vessel with a contracted or capillary exit and containing broken or crushed glass, substantially as set forth.

2. The combination, with mercurial vacuum apparatus, of a filter for cleaning the mercury, located between the elevated mercury-reservoir and the point of exhaustion, substantially as set forth.

3. The combination, with a Sprengel or drop pump, of a filtering-tube containing broken or crushed glass and having a contracted exit, said filtering-tube being located between the elevated mercury-reservoir and the drop-tube of the pump, substantially as set forth.

This specification signed and witnessed this 25th day of November, 1881.

T. A. EDISON.

Witnesses:
RICHD. N. DYER,
WM. H. MEADOWCROFT.